(12) United States Patent
Lee et al.

(10) Patent No.: US 12,354,182 B2
(45) Date of Patent: Jul. 8, 2025

(54) IMAGE PROCESSING CIRCUIT PERFORMING FILTERING PROCESS ON SET OF PIXELS TO GENERATE SET OF PROCESSED PIXELS AND IMAGE PROCESSING METHOD

(71) Applicant: Realtek Semiconductor Corporation, Hsinchu (TW)

(72) Inventors: Kung Ho Lee, Hsinchu (TW); Yu Cheng Cheng, Hsinchu (TW); Jia Wei Wu, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 423 days.

(21) Appl. No.: 18/164,635

(22) Filed: Feb. 6, 2023

(65) Prior Publication Data

US 2024/0046402 A1  Feb. 8, 2024

(30) Foreign Application Priority Data

Aug. 3, 2022 (TW) .................................. 111129175

(51) Int. Cl.
  *G06T 1/20* (2006.01)
  *G06T 5/20* (2006.01)
  *G06T 5/70* (2024.01)

(52) U.S. Cl.
  CPC .................. *G06T 1/20* (2013.01); *G06T 5/20* (2013.01); *G06T 5/70* (2024.01)

(58) Field of Classification Search
  None
  See application file for complete search history.

(56) References Cited

U.S. PATENT DOCUMENTS

| | | | |
|---|---|---|---|
| 6,359,658 B1 * | 3/2002 | He | H04N 5/21 |
| | | | 348/E17.001 |
| 11,538,142 B2 * | 12/2022 | Bak | G06T 1/20 |
| 2020/0167903 A1 * | 5/2020 | Wang | G06T 5/92 |
| 2021/0350505 A1 * | 11/2021 | Lee | G06T 7/90 |
| 2022/0070373 A1 * | 3/2022 | Lee | H04N 23/667 |

FOREIGN PATENT DOCUMENTS

TW  201225631 A  6/2012

* cited by examiner

*Primary Examiner* — Haris Sabah
(74) *Attorney, Agent, or Firm* — CKC & Partners Co., LLC (57) ABSTRACT

An image processing circuit includes a first buffer circuit, a first selector circuit, a processor circuit, a second buffer circuit, and an assigning circuit. The first buffer circuit receives pixels in a sliding window of an image. The first selector circuit outputs the pixels according to a mode signal. The processor circuit performs a first filtering process on the pixels to generate first processed pixels. The assigning circuit transmits the first processed pixels to a back-end circuit or transmits the first processed pixels to the second buffer circuit. When the assigning circuit transmits the first processed pixels to the second buffer circuit, the first selector circuit transmits the first processed pixels to the processor circuit, the processor circuit performs a second filtering process on the first processed pixels to generate second processed pixels, and the assigning circuit transmits the second processed pixels to the back-end circuit.

20 Claims, 5 Drawing Sheets

IMAGE PROCESSING CIRCUIT PERFORMING FILTERING PROCESS ON SET OF PIXELS TO GENERATE SET OF PROCESSED PIXELS AND IMAGE PROCESSING METHOD

RELATED APPLICATIONS

This application claims priority to Taiwanese Application Serial Number 111129175, filed Aug. 3, 2022, which is herein incorporated by reference.

BACKGROUND

Technical Field

The present disclosure relates to image processing technology. More particularly, the present disclosure relates to an image processing circuit and an image processing method capable of cancelling noise and with adaptive characteristics.

Description of Related Art

With developments of technology, various display devices and various image processing technologies have been developed. For example, in some related approaches, a filtering process can be used to cancel noise in an image. However, when the filtering process is too strong, edges of the image may be blurred. When the filtering process is too weak, the noise in the image may not be cancelled completely.

SUMMARY

Some aspects of the present disclosure are to provide an image processing circuit. The image processing circuit includes a first buffer circuit, a first selector circuit, a processor circuit, a second buffer circuit, and an assigning circuit. The first buffer circuit is configured to receive a plurality of pixels in a sliding window of an image. The first selector circuit is configured to output the plurality of pixels according to a mode signal. The processor circuit is configured to perform a first filtering process on the plurality of pixels to generate a plurality of first processed pixels. The assigning circuit is configured to transmit the plurality of first processed pixels to a back-end circuit or transmit the plurality of first processed pixels to the second buffer circuit according to the mode signal. When the assigning circuit transmits the plurality of first processed pixels to the second buffer circuit, the first selector circuit transmits the plurality of first processed pixels to the processor circuit, the processor circuit performs a second filtering process on the plurality of first processed pixels to generate a plurality of second processed pixels, and the assigning circuit transmits the plurality of second processed pixels to the back-end circuit.

Some aspects of the present disclosure are to provide an image processing method. The image processing method includes following operations: receiving, by a first buffer circuit, a plurality of pixels in a sliding window of an image; outputting, by a first selector circuit, the plurality of pixels according to a mode signal; performing, by a processor circuit, a first filtering process on the plurality of pixels to generate a plurality of first processed pixels; transmitting, by an assigning circuit, the plurality of first processed pixels to a back-end circuit or transmitting, by the assigning circuit, the plurality of first processed pixels to a second buffer circuit according to the mode signal; and when the assigning circuit transmits the plurality of first processed pixels to the second buffer circuit: transmitting, by the first selector circuit, the plurality of first processed pixels to the processor circuit; performing, by the processor circuit, a second filtering process on the plurality of first processed pixels to generate a plurality of second processed pixels; and transmitting, by the assigning circuit, the plurality of second processed pixels to the back-end circuit.

As described above, the image processing circuit and the image processing method of the present disclosure can perform one filtering process or two filtering processes on the pixels according to the mode signal to realize the adaptive noise cancelling procedure. In addition, in the present disclosure, the two filtering processes are performed by using the same storage circuit and the same storage element. Accordingly, hardware cost and circuit area can be saved. Furthermore, in some embodiments, the filtering weight values of the two filtering processes are different to combine different noise cancelling effects for the pixels at different positions so as to avoid blurring or to avoid the inability of cancelling noise.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
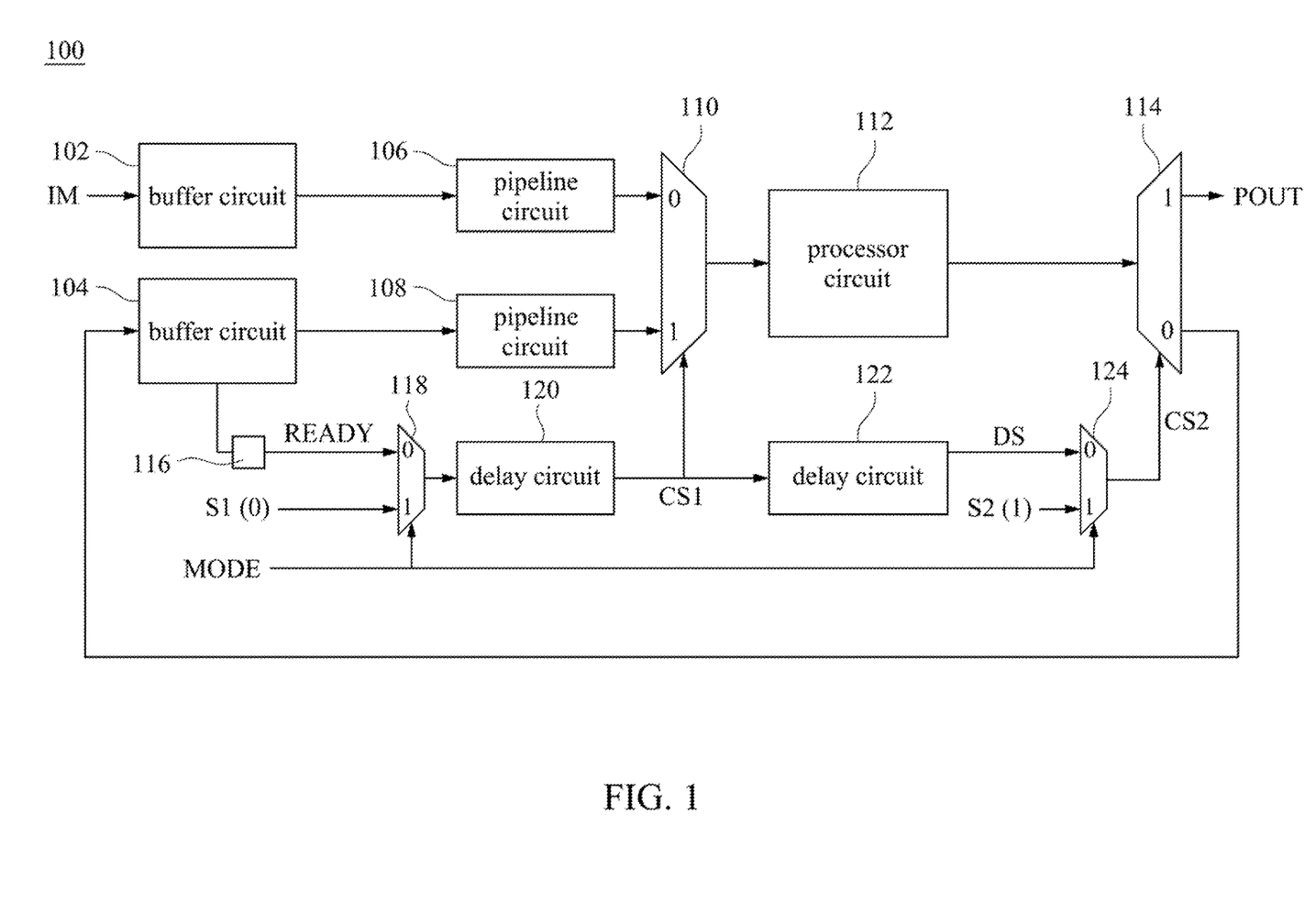
FIG. 1 is a schematic diagram of an image processing circuit according to some embodiments of the present disclosure.
Figure 2:
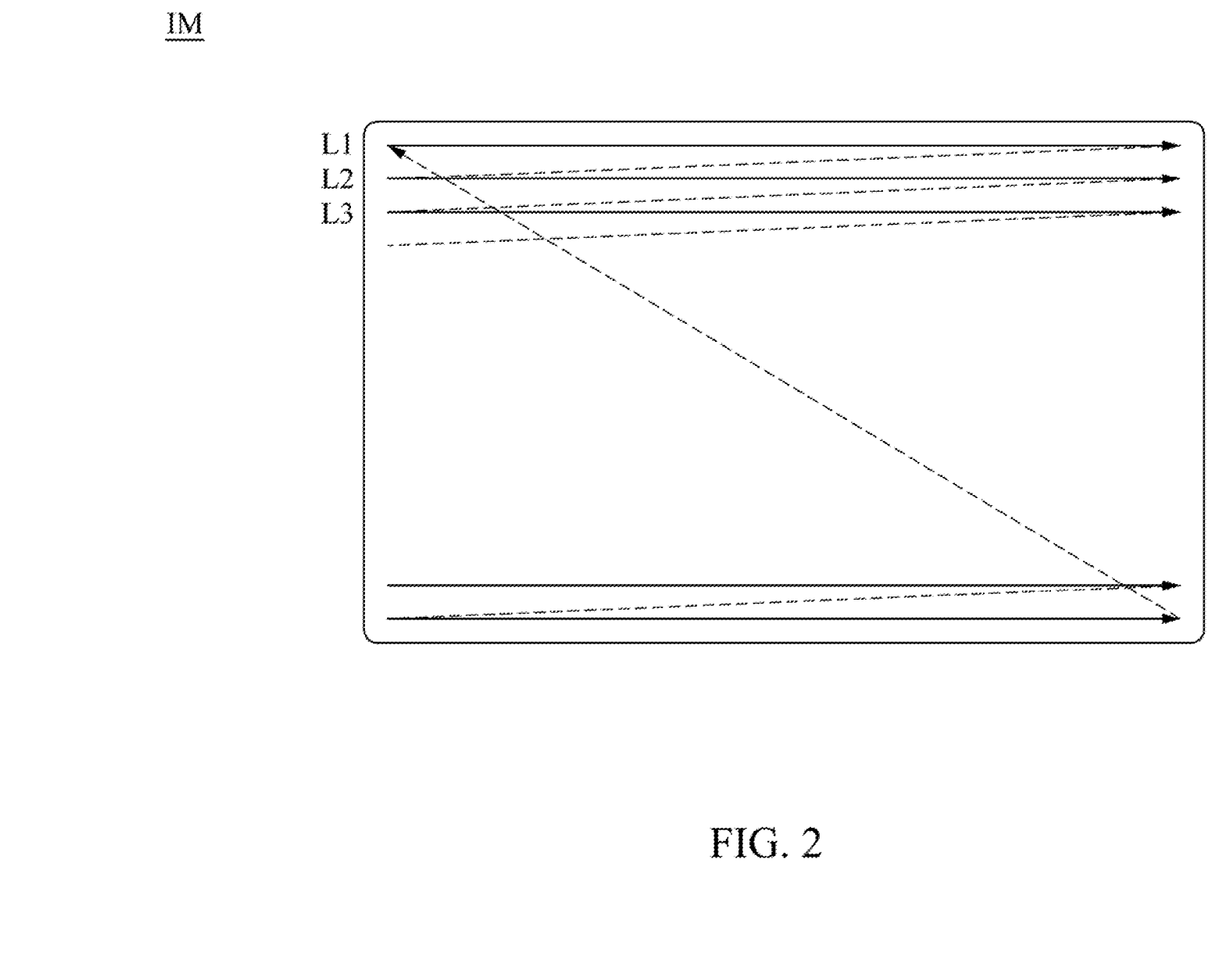
FIG. 2 is a schematic diagram of an image according to some embodiments of the present disclosure.

References are made to FIG. 1 and FIG. 2. FIG. 1 is a schematic diagram of an image processing circuit 100 according to some embodiments of the present disclosure. FIG. 2 is a schematic diagram of an image IM according to some embodiments of the present disclosure.

As illustrated in FIG. 1 and FIG. 2, the image processing circuit 100 can perform an image processing process on the image IM. The image processing process can be a filtering process. The filtering process is mainly used to cancel (blur) the noise in the image IM. The filtering process can be a non-linear filtering process.

In some embodiments, the image processing circuit 100 adapts the raster scan mechanism to perform the filtering process. As the image IM in FIG. 2 as illustration, the image processing circuit 100 first performs the filtering process on the leftmost pixel in the first row L1. Then, the image processing circuit 100 performs the filtering process on the second pixel from the left in the first row L1, and so on. After the image processing circuit 100 performs the filtering process on all of the pixels in the first row L1, the image processing circuit 100 performs the filtering process on the leftmost pixel in the second row L2, and so on to the third row L3 and other rows.

In some embodiments, the image processing circuit 100 can determine the filtering number for each pixel and determine the filtering range according to a size of the image IM (e.g., determine a logic value of a mode signal MODE in FIG. 1 according to the size of the image IM).

For example, when a horizontal pixel number of the image IM is less than or equal to a first threshold value (e.g., 1920), the mode signal MODE has a first logic value (e.g., a logic value 0). Accordingly, the image processing circuit 100 performs two filtering processes on each pixel. On the contrary, when the horizontal pixel number of the image IM is greater than the first threshold value (e.g., 1920), the mode signal MODE has a second logic value (e.g., a logic value 1). Accordingly, the image processing circuit 100 performs one filtering process on each pixel.

Furthermore, when the horizontal pixel number of the image IM is less than or equal to a second threshold value (e.g., 1280), the filtering range includes a first number of pixels (e.g., 25 pixels). On the contrary, when the horizontal pixel number of the image IM is greater than the second threshold value (e.g., 1280), the filtering range includes a second number of pixels (e.g., 9 pixels).

In the aforementioned embodiments, the second threshold value is less than the first threshold value, and the first number is greater than the second number.

It is noted that although the size of the image IM is the horizontal pixel number of the image IM in the aforementioned embodiments, the present disclosure is not limited thereto. In some other embodiments, the size of the image IM can be a total pixel number of the image IM.

Figure 3:
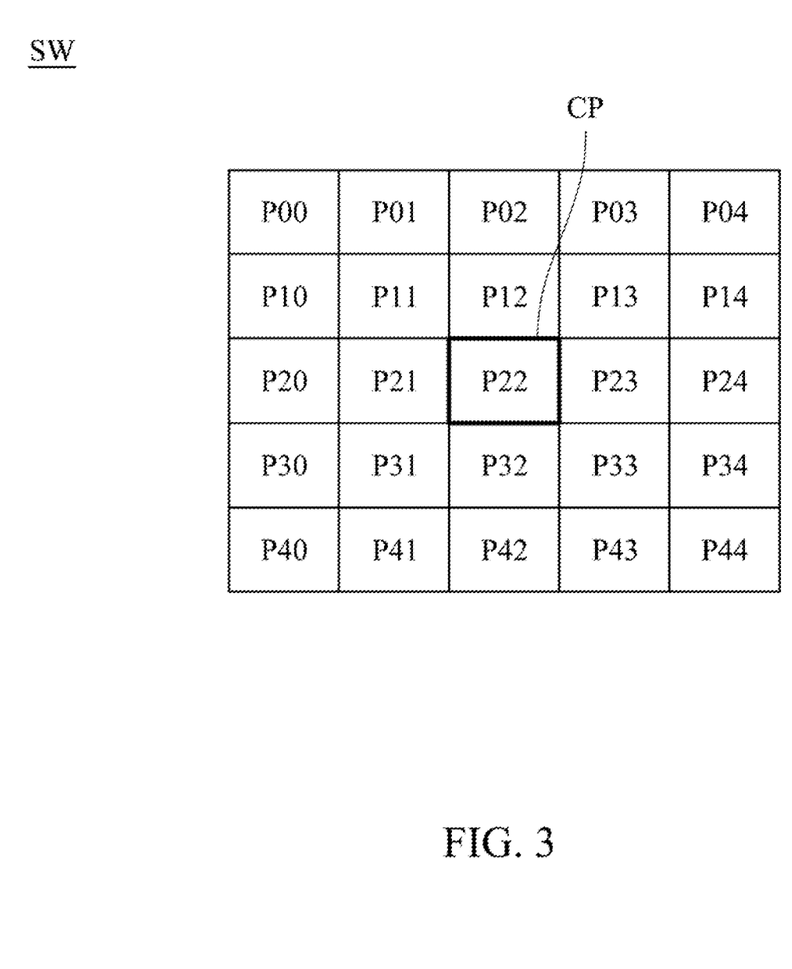
FIG. 3 is a schematic diagram of a sliding window according to some embodiments of the present disclosure.

Reference is made to FIG. 3. FIG. 3 is a schematic diagram of a sliding window SW according to some embodiments of the present disclosure. The aforementioned "filtering range" can refer the number of the pixels in the sliding window.

Taking the aforementioned embodiments as an example, when the filtering range includes the first number of pixels (e.g., 25 pixels), it represents that the sliding window SW includes 25 pixels, as shown in FIG. 3. When the filtering range includes the second number of pixels (e.g., 9 pixels), it represents that the sliding window SW includes 9 pixels.

As illustrated in FIG. 3, the sliding window SW includes pixels P00-P04, pixels P10-P14, pixels P20-P24, pixels P30-P34, and pixels P40-P44. The pixel P22 at a center position CP of the sliding window SW is the filtering target. In other words, except for the pixel P22, other pixels in the sliding window SW can correspond to filtering weight values respectively. The processor circuit 112 can perform the filtering process on the pixel P22 according to these filtering weight values of other pixels. In practical applications, the center position CP of the sliding window SW moves according to the raster scan mechanism in FIG. 2 to perform the filtering process on the pixels in the image IM sequentially. However, when the sliding window SW covers the outside of the image IM, the outside of the image IM is processed by repeating the boundary of the image IM.

The details of how the image processing circuit 100 performs one filtering process or two filtering processes according to the mode signal MODE are described in following paragraphs.

Reference is made to FIG. 1 again. The image processing circuit 100 includes a buffer circuit 102, a buffer circuit 104, a pipeline circuit 106, a pipeline circuit 108, a selector circuit 110, a processor circuit 112, an assigning circuit 114, a detector circuit 116, a selector circuit 118, a delay circuit 120, a delay circuit 122, and a selector circuit 124.

In some embodiments, the buffer circuit 102 and the buffer circuit 104 can be implemented by line buffers. The pipeline circuit 106 and the pipeline circuit 108 can include one or more registers. The selector circuit 110, the selector circuit 118, and the selector circuit 124 can be implemented by multiplexers. The processor circuit 112 can be implemented by a central processing unit (CPU) or other circuits supporting image processing functions. The assigning circuit 114 can be implemented by a de-multiplexer. The detector circuit 116 can be implemented by one Application Specific Integrated Circuit (ASIC). The delay circuit 120 and the delay circuit 122 can be implemented by pipeline circuits. In other words, the delay circuit 120 and the delay circuit 122 can include one or more registers.

The pipeline circuit 106 is coupled between the buffer circuit 102 and a first input terminal of the selector circuit 110. The pipeline circuit 108 is coupled between the buffer circuit 104 and a second input terminal of the selector circuit 110. The first input terminal of the selector circuit 110 corresponds to the first logic value (e.g., the logic value 0), and the second input terminal of the selector circuit 110 corresponds to the second logic value (e.g., the logic value 1).

The processor circuit 112 is coupled between an output terminal of the selector circuit 110 and an input terminal of the assigning circuit 114. A first output terminal of the assigning circuit 114 can be coupled to a back-end circuit. In some embodiments, the back-end circuit can perform a subsequent processing process according to output pixels POUT from the assigning circuit 114. In some embodiments, the back-end circuit can be a display panel. The display panel can display corresponding image according to the output pixels POUT. A second output terminal of the assigning circuit 114 can be coupled to an input terminal of the buffer circuit 104. The first output terminal of the assigning circuit 114 corresponds to the second logic value (e.g., the logic value 1), and the second output terminal of the assigning circuit 114 corresponds to the first logic value (e.g., the logic value 0).

The detector circuit 116 is coupled between the buffer circuit 104 and a first input terminal of the selector circuit 118. A first input terminal of the selector circuit 118 can receive a ready signal READY from the detector circuit 116. A second input terminal of the selector circuit 118 can receive a signal S1 with the first logic value (e.g., the logic value 0). A control terminal of the selector circuit 118 can receive the mode signal MODE. The first input terminal of the selector circuit 118 corresponds to the first logic value (e.g., the logic value 0), and the second input terminal of the selector circuit 118 corresponds to the second logic value (e.g., the logic value 1).

The delay circuit 120 is coupled to an output terminal of the selector circuit 118 and a control terminal of the selector circuit 110. The delay circuit 122 is coupled between an output terminal of the delay circuit 120 and a first input terminal of the selector circuit 124.

The selector circuit 124 is coupled between the delay circuit 122 and the assigning circuit 114. The first input terminal of the selector circuit 124 can receive a delay signal DS from the delay circuit 122. A second input terminal of the selector circuit 124 can receive a signal S2 with the second logic value (e.g., the logic value 1). A control terminal of the selector circuit 124 can receive the mode signal MODE. An output terminal of the selector circuit 124 is coupled to a control terminal of the assigning circuit 114. The first input terminal of the selector circuit 124 corresponds to the first logic value (e.g., the logic value 0), and the second input terminal of the selector circuit 124 corresponds to the second logic value (e.g., the logic value 1).

Figure 4:
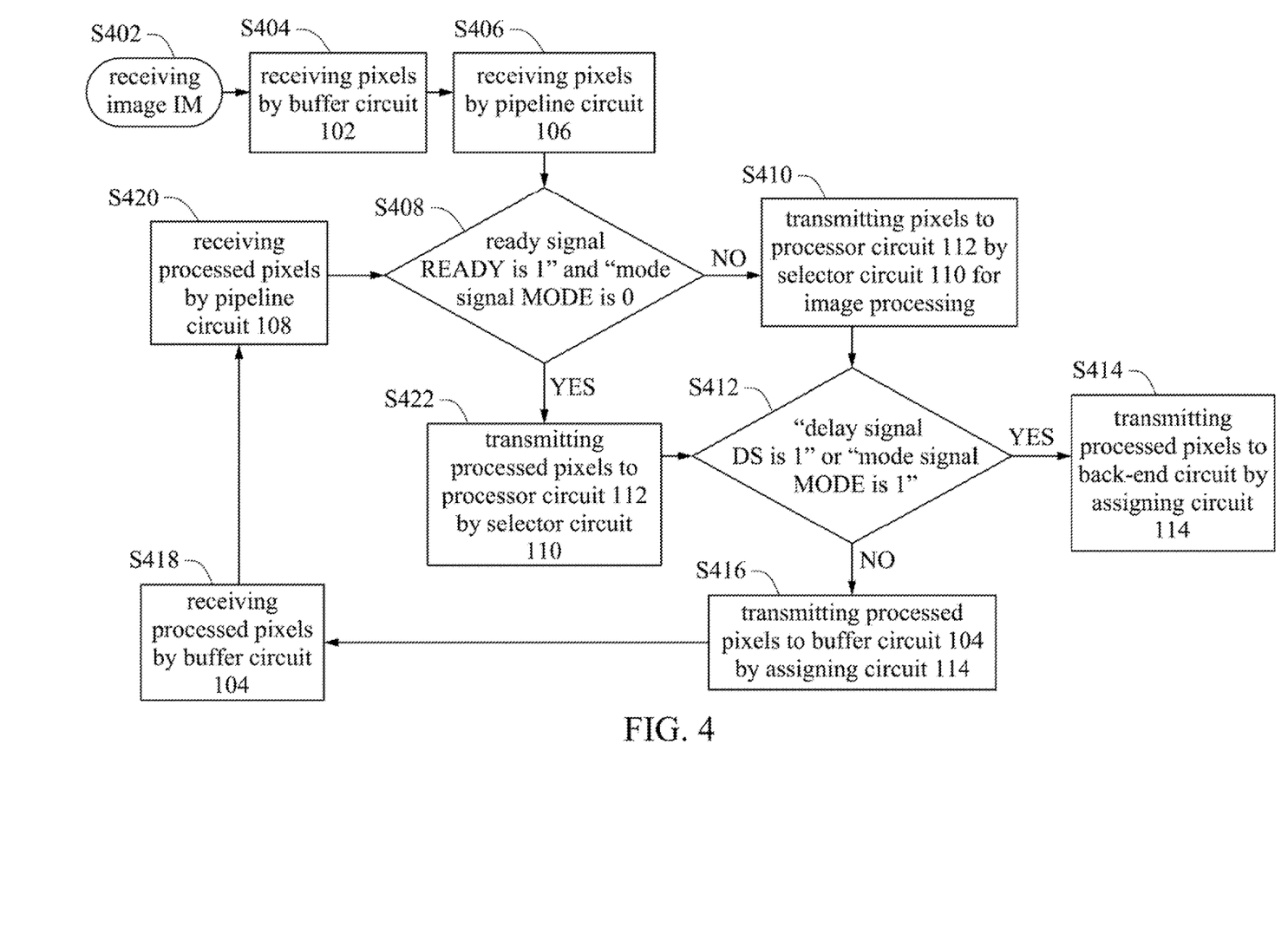
FIG. 4 is a flow diagram of an image processing method according to some embodiments of the present disclosure.

Reference is made to FIG. 4. FIG. 4 is a flow diagram of an image processing method 400 according to some embodiments of the present disclosure.

In some embodiments, the image processing method 400 can be applied to the image processing circuit 100 in FIG. 1, but the present disclosure is not limited thereto. For better understanding, the image processing method 400 is described with reference with the image processing circuit 100 in FIG. 1 in following paragraphs.

The following paragraphs describe an example that the horizontal pixel number of the image IM is less than or equal to the first threshold value (e.g., 1920) and less than the second threshold value (e.g., 1280). In other words, the mode signal MODE has the first logic value (e.g., the logic value 0) such that the image processing circuit 100 performs two filtering processes for each pixel and the filtering range (the sliding window SW) includes the first number of pixels (e.g., pixels).

In operation S402, the image processing circuit 100 receives the image IM.

In operation S404, the buffer circuit 102 receives the pixels in the sliding window SW to collect enough rows (vertical points). In this embodiment, the filtering range includes the first number of pixels (e.g., 25 pixels). As described above, the buffer circuit 102 can be implemented by a line buffer. Accordingly, the buffer circuit 102 can temporarily store at least four rows of pixels. When the pixels in the fifth row are read by the buffer circuit 102, it represents that the buffer circuit 102 has collected enough rows and the buffer circuit 102 can transmit the pixels to the pipeline circuit 106.

In operation S406, the pipeline circuit 106 receives the pixels from the buffer circuit 102 to collect enough columns (horizontal points). When the pipeline circuit 106 temporarily store five columns of pixels, it represents that the pipeline circuit 106 has collected enough columns and the pipeline circuit 106 can transmit the pixels to the selector circuit 110.

In operation S408, it is determined whether the ready signal READY has the second logic value (e.g., the logic value 1) and whether the mode signal MODE has the first logic value (e.g., the logic value 0) to enter operation S410 or operation S422.

Figure 5:
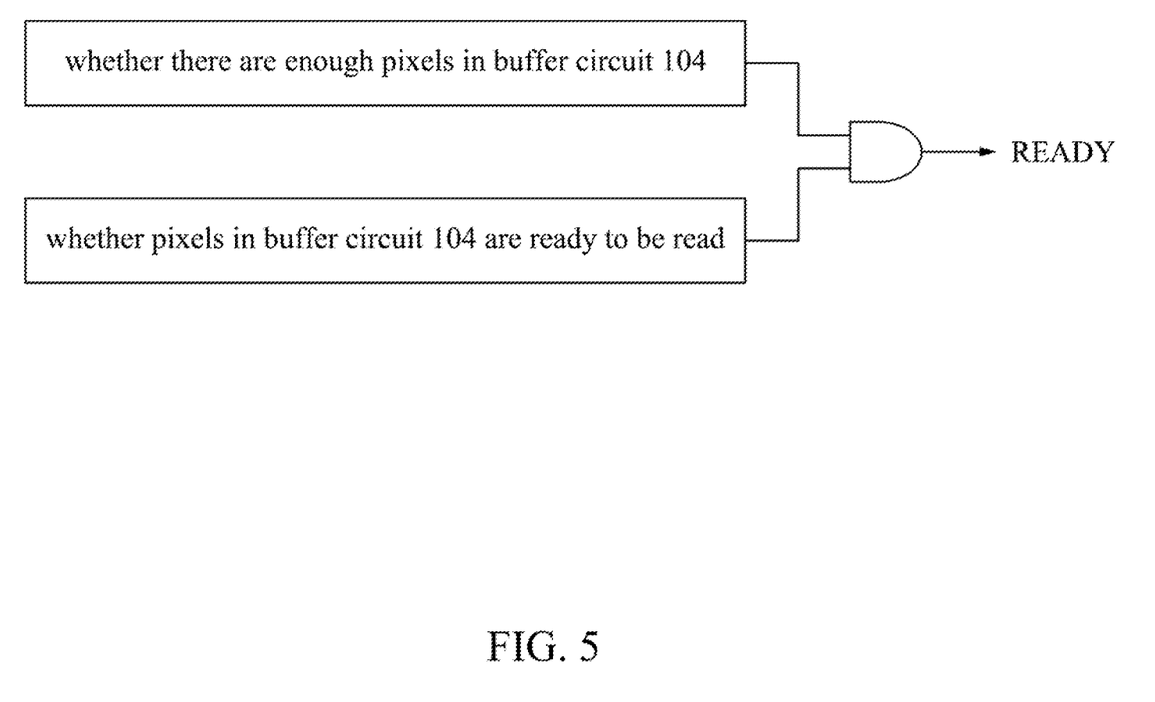
FIG. 5 is a schematic diagram of operations of a detector circuit according to some embodiments of the present disclosure.

The details of how the detector circuit 116 generates the ready signal READY are described with reference to FIG. 5. FIG. 5 is a schematic diagram of operations of the detector circuit 116 according to some embodiments of the present disclosure.

As illustrated in FIG. 1 and FIG. 5, the detector circuit 116 can detect whether there are enough pixels in the buffer circuit 104 and detect whether the pixels in the buffer circuit 104 are ready to be read to generate the ready signal READY. When there are enough pixels in the buffer circuit 104 (e.g., there are four rows of pixels in the buffer circuit 104) and the pixels in the buffer circuit 104 are ready to be read (e.g., the buffer circuit 104 is receiving the pixels in the fifth row), the ready signal READY has the second logic value (e.g., the logic value 1). The ready signal READY has the first logic value (e.g., the logic value 0) in other conditions.

References are made to FIG. 1 and FIG. 4 again. Since the buffer circuit 104 has not received any pixel yet, the ready signal READY has the first logic value (e.g., the logic value 0). Since the ready signal READY has the first logic value (e.g., the logic value 0), the determination result of operation S408 is "NO" and it enters operation S410.

In operation S410, the selector circuit 110 outputs the pixels from the pipeline circuit 106 to the processor circuit 112 according to the mode signal MODE for the image processing process. As described above, in this embodiment, the mode signal MODE has the first logic value (e.g., the logic value Accordingly, the selector circuit 118 outputs the ready signal READY to the delay circuit 120 according to the mode signal MODE with the first logic value (e.g., the logic value 0). As described above, the ready signal READY has the first logic value (e.g., the logic value 0). Accordingly, the delay circuit 120 outputs a control signal CS1 with the first logic value (e.g., the logic value 0) to the control terminal of the selector circuit 110. Thus, the selector circuit 110 outputs the pixels from the pipeline circuit 106 to the processor circuit 112 according to the control signal CS1 with the first logic value (e.g., the logic value 0). Then, the processor circuit 112 performs the first filtering process on the pixels to generate first processed pixels. In some embodiments, the delay circuit 120 can introduce a delay time into the ready signal READY or into the signal S1 such that the control signal CS1 is synchronized with the transmission of the pixels.

In operation S412, it is determined whether the delay signal DS has the second logic value (e.g., the logic value 1) or whether the mode signal MODE has the second logic value (e.g., the logic value 1) to enter operation S414 or operation S416. Since the control signal CS1 has the first logic value (e.g., the logic value 0), the delay signal DS also has the first logic value (e.g., the logic value 0). Since the delay signal DS and the mode signal MODE have the first logic value (e.g., the logic value 0), the determination result of operation S412 is "NO" and it enters operation S416.

In operation S416, the assigning circuit 114 transmits the first processed pixels to the buffer circuit 104. To be more specific, the selector circuit 124 outputs the delay signal DS to be a control signal CS2 according to the mode signal MODE with the first logic value (e.g., the logic value 0) and transmits the control signal CS2 to the control terminal of the assigning circuit 114. Since the delay signal DS has the first logic value (e.g., the logic value 0), the control signal CS2 also has the first logic value (e.g., the logic value 0). In some embodiments, the delay circuit 122 can introduce a delay time into the control signal CS1 to generate the delay signal DS such that the control signal CS2 is synchronized with the transmission of the pixels. Since the control signal CS2 has the first logic value (e.g., the logic value 0), the assigning circuit 114 can transmit the first processed pixels to the buffer circuit 104 through its second output terminal according to the control signal CS2 with the first logic value (e.g., the logic value 0).

Operation S418 is similar to operation S404. The buffer circuit 104 receives the first processed pixels from the assigning circuit 114 to collect enough rows (vertical points). As described above, the buffer circuit 104 can be implemented by a line buffer. Accordingly, the buffer circuit 104 can temporarily store at least four rows of pixels (it represents that there are enough pixels in the buffer circuit 104). When the pixels in the fifth row are read by the buffer circuit 104 (it represents that the pixels in the buffer circuit 104 are ready to be read), the buffer circuit 104 can transmit the first processed pixels to the pipeline circuit 108 and the ready signal READY in FIG. 5 has the second logic value (e.g., the logic value 1).

Operation S420 is similar to operation S406. The pipeline circuit 108 receives the first processed pixels from the buffer circuit 104 to collect enough columns (horizontal points). When the pipeline circuit 108 temporarily stores fifth columns of pixels, it represents that the pipeline circuit 108 has collected enough columns and the pipeline circuit 108 can transmit the first processed pixels to the selector circuit 110.

Operation S408 is entered again. As described above, since the ready signal READY has the second logic value (e.g., the logic value 1) and the mode signal MODE has the first logic value (e.g., the logic value 0), the determination result of operation S408 is "YES" and it enters operation S422.

In operation S422, the selector circuit 110 transmits the first processed pixels to the processor circuit 112. To be more specific, since the mode signal MODE has the first logic value (e.g., the logic value 0), the selector circuit 118 transmits the ready signal READY to the delay circuit 120 to generate the control signal CS1. Since the ready signal READY has the second logic value (e.g., the logic value 1), the control signal CS1 also has the second logic value (e.g., the logic value 1). Accordingly, the selector circuit 110 can transmit the first processed pixels from the pipeline circuit 108 to the processor circuit 112 according to the control signal CS1 with the second logic value (e.g., the logic value 1). Then, the processor circuit 112 performs a second filtering process on the first processed pixels to generate second processed pixels. In some embodiments, the second filtering process is different from the first filtering process. For example, the filtering weight values of the second filtering process are different from the filtering weight values of the first filtering process.

In operation S412, it is determined whether the delay signal DS has the second logic value (e.g., the logic value 1) or whether the mode signal MODE has the second logic value (e.g., the logic value 1) to enter operation S414 or operation S416. Since the control signal CS1 has the second logic value (e.g., the logic value 1), the delay signal DS also has the second logic value (e.g., the logic value 1). Since the delay signal DS has the second logic value (e.g., the logic value 1), the determination result of operation S412 is "YES" and it enters operation S414.

In operation S414, the assigning circuit 114 transmits the second processed pixels to the back-end circuit. To be more specific, the selector circuit 124 outputs the delay signal DS to be the control signal CS2 according to the mode signal MODE with the first logic value (e.g., the logic value 0) and transmits the control signal CS2 to the control terminal of the assigning circuit 114. Since the delay signal DS has the second logic value (e.g., the logic value 1), the control signal CS2 also has the second logic value (e.g., the logic value 1). Accordingly, the assigning circuit 114 can transmit the second processed pixels to the back-end circuit through its first output terminal according to the control signal CS2 with the second logic value (e.g., the logic value 1).

Based on the operations above, the processor circuit 112 can perform two filtering processes on the pixels in the image IM.

In addition, in an embodiment where the horizontal pixel number of the image IM is less than or equal to the first threshold value (e.g., 1920) but greater than the second threshold value (e.g., 1280), the image processing circuit 100 performs operations similar to the aforementioned embodiments. One of differences between this embodiment and the aforementioned embodiments is that the filtering range in this embodiment includes the second number of pixels (e.g., 9 pixels).

In addition, in an embodiment where the horizontal pixel number of the image IM is greater than the first threshold value (e.g., 1920 but it is not limited thereto), as described above, the mode signal MODE has the second logic value (e.g., the logic value 1) and the image processing circuit 100 only performs one filtering process on each pixel. Differences between this embodiment and the aforementioned embodiments are described in following paragraphs.

Since the mode signal MODE has the second logic value (e.g., the logic value 1), the selector circuit 118 transmits the signal S1 to the delay circuit 120 according to the mode signal MODE with the second logic value (e.g., the logic value 1). Since the signal S1 has the first logic value (e.g., the logic value 0), the delay circuit 120 outputs the control signal CS1 with the first logic value (e.g., the logic value 0) correspondingly to the control terminal of the selector circuit 110. Accordingly, the selector circuit 110 transmits the unprocessed pixels from the pipeline circuit 106 to the processor circuit 112 according to the control signal CS1 with the first logic value (e.g., the logic value 0). Then, the processor circuit 112 performs the first filtering process on the pixels, as operation S410.

In addition, in operation S412, since the mode signal MODE has the second logic value (e.g., the logic value 1), the determination result of operation S412 is "YES" and it enters operation S414. In operation S414, the selector circuit 124 outputs the signal S2 to be the control signal CS2 according to the mode signal MODE with the second logic value (e.g., the logic value 1) and transmits the control signal CS2 to the control terminal of the assigning circuit 114. Since the signal S2 has the second logic value (e.g., the logic value 1), the control signal CS2 has the second logic value (e.g., the logic value 1). Accordingly, the assigning circuit 114 can transmit the first processed pixels directly to the back-end circuit through its first output terminal according to the control signal CS2 with the second logic value (e.g., the logic value 1).

As described above, the image processing circuit and the image processing method of the present disclosure can perform one filtering process or two filtering processes on the pixels according to the mode signal to realize the adaptive noise cancelling procedure. In addition, in the present disclosure, the two filtering processes are performed by using the same storage circuit and the same storage element. Accordingly, hardware cost and circuit area can be saved. Furthermore, in some embodiments, the filtering weight values of the two filtering processes are different to combine different noise cancelling effects for the pixels at different positions so as to avoid blurring or to avoid the inability of cancelling noise.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. An image processing circuit, comprising:
a first buffer circuit configured to receive a plurality of pixels in a sliding window of an image;

a first selector circuit configured to output the plurality of pixels according to a mode signal;
a processor circuit configured to perform a first filtering process on the plurality of pixels to generate a plurality of first processed pixels;
a second buffer circuit; and
an assigning circuit configured to transmit the plurality of first processed pixels to a back-end circuit or transmit the plurality of first processed pixels to the second buffer circuit according to the mode signal,
wherein when the assigning circuit transmits the plurality of first processed pixels to the second buffer circuit, the first selector circuit transmits the plurality of first processed pixels to the processor circuit, the processor circuit performs a second filtering process on the plurality of first processed pixels to generate a plurality of second processed pixels, and the assigning circuit transmits the plurality of second processed pixels to the back-end circuit.

2. The image processing circuit of claim 1, wherein the first filtering process is different from the second filtering process.

3. The image processing circuit of claim 1, wherein the mode signal is associated with a size of the image.

4. The image processing circuit of claim 3, wherein the size of the image is a horizontal pixel number of the image or a total pixel number of the image.

5. The image processing circuit of claim 3, wherein when the size is less than or equal to a first threshold value, the mode signal has a first logic value, wherein when the size is greater than the first threshold value, the mode signal has a second logic value.

6. The image processing circuit of claim 5, wherein when the size is less than or equal to a second threshold value, the plurality of pixels in the sliding window correspond to a first number, wherein when size is greater than the second threshold value, the plurality of pixels in the sliding window correspond to a second number, wherein the second threshold value is less than the first threshold value, and the first number is greater than the second number.

7. The image processing circuit of claim 5, wherein each of the first buffer circuit and the second buffer circuit is a line buffer, wherein the image processing circuit further comprises:
a first pipeline circuit coupled between the first buffer circuit and a first input terminal of the first selector circuit; and
a second pipeline circuit coupled between the second buffer circuit and a second input terminal of the first selector circuit,
wherein the first input terminal of the first selector circuit corresponds to the first logic value, and the second input terminal of the first selector circuit corresponds to the second logic value.

8. The image processing circuit of claim 5, wherein a first output terminal of the assigning circuit is configured to transmit the plurality of first processed pixels or the plurality of second processed pixels to the back-end circuit, and a second output terminal of the assigning circuit is configured to transmit the plurality of first processed pixels to the second buffer circuit,
wherein the first output terminal of the assigning circuit corresponds to the second logic value, and the second output terminal of the assigning circuit corresponds to the first logic value.

9. The image processing circuit of claim 8, further comprising:

a detector circuit configured to detect whether the plurality of pixels in the second buffer circuit are enough and detect whether the plurality of pixels in the second buffer circuit are ready to be read to generate a ready signal.

10. The image processing circuit of claim 9, further comprising:
a second selector circuit, wherein a first input terminal of the second selector circuit is configured to receive the ready signal, a second input terminal of the second selector circuit is configured to receive a first signal with the first logic value, and a control terminal of the second selector circuit is configured to receive the mode signal,
wherein the first input terminal of the second selector circuit corresponds to the first logic value, and the second input terminal of the second selector circuit corresponds to the second logic value.

11. The image processing circuit of claim 10, further comprising:
a first delay circuit coupled between the second selector circuit and the first selector circuit, wherein the first delay circuit is configured to introduce a first delay time into the ready signal or into the first signal to transmit a first control signal to a control terminal of the first selector circuit.

12. The image processing circuit of claim 11, further comprising:
a second delay circuit coupled to the first delay circuit and configured to introduce a second delay time into the first control signal to generate a delay signal; and
a third selector circuit coupled between the second delay circuit and the assigning circuit, wherein a first input terminal of the third selector circuit is configured to receive the delay signal, a second input terminal of the third selector circuit is configured to receive a second signal with the second logic value, and a control terminal of the third selector circuit is configured to receive the mode signal,
wherein the first input terminal of the third selector circuit corresponds to the first logic value, and the second input terminal of the third selector circuit corresponds to the second logic value.

13. The image processing circuit of claim 12, wherein the third selector circuit is configured to transmit the delay signal or the second signal to a control terminal of the assigning circuit according to the mode signal.

14. The image processing circuit of claim 12, wherein the first selector circuit, the second selector circuit, or the third selector circuit is a multiplexer, and the assigning circuit is a de-multiplexer.

15. An image processing method, comprising:
receiving, by a first buffer circuit, a plurality of pixels in a sliding window of an image;
outputting, by a first selector circuit, the plurality of pixels according to a mode signal;
performing, by a processor circuit, a first filtering process on the plurality of pixels to generate a plurality of first processed pixels;
transmitting, by an assigning circuit, the plurality of first processed pixels to a back-end circuit or transmitting, by the assigning circuit, the plurality of first processed pixels to a second buffer circuit according to the mode signal; and
when the assigning circuit transmits the plurality of first processed pixels to the second buffer circuit:

transmitting, by the first selector circuit, the plurality of first processed pixels to the processor circuit;

performing, by the processor circuit, a second filtering process on the plurality of first processed pixels to generate a plurality of second processed pixels; and transmitting, by the assigning circuit, the plurality of second processed pixels to the back-end circuit.

16. The image processing method of claim 15, wherein the first filtering process is different from the second filtering process.

17. The image processing method of claim 15, wherein the mode signal is associated with a size of the image.

18. The image processing method of claim 17, wherein the size of the image is a horizontal pixel number of the image or a total pixel number of the image.

19. The image processing method of claim 18, wherein when the size is less than or equal to a first threshold value, the mode signal has a first logic value, wherein when the size is greater than the first threshold value, the mode signal has a second logic value.

20. The image processing method of claim 19, wherein when the size is less than or equal to a second threshold value, the plurality of pixels in the sliding window correspond to a first number, wherein when size is greater than the second threshold value, the plurality of pixels in the sliding window correspond to a second number, wherein the second threshold value is less than the first threshold value, and the first number is greater than the second number.

* * * * *